United States Patent [19]

Murakami et al.

[11] Patent Number: 5,023,732
[45] Date of Patent: Jun. 11, 1991

[54] MAGNETIC DISK APPARATUS HAVING A CIRCUIT FOR DETECTING THE POSITION OF SERVO INFORMATION RECORDED ON A MAGNETIC DISK

[75] Inventors: Yoichi Murakami, Tokyo; Yoshihisa Okawa; Takao Ishikawa, both of Gunma, all of Japan

[73] Assignee: NEC Corporation, Tokyo, Japan

[21] Appl. No.: 413,492

[22] Filed: Sep. 27, 1989

[30] Foreign Application Priority Data

Sep. 28, 1988 [JP] Japan ................................. 63-245031

[51] Int. Cl.5 ............................................. G11B 5/596
[52] U.S. Cl. ................................. 360/77.08; 360/77.02
[58] Field of Search .... 360/77.02, 77.05, 77.07–77.11, 360/51

[56] References Cited

U.S. PATENT DOCUMENTS 4,188,646  2/1980  Sordello et al. ................. 360/77.08
4,549,232  10/1985  Axmear et al. ................. 360/77.07

Primary Examiner—Aristotelis M. Psitos
Assistant Examiner—Steven R. Garland
Attorney, Agent, or Firm—Sughrue, Mion, Zinn, Macpeak & Seas

[57] ABSTRACT

A magnetic disk apparatus has a circuit for detecting the recorded position of servo information, used for aligning a magnetic head, on a target track of a magnetic disk. The circuit discriminates the track's data area and the servo information area by determining an amplitude difference between detection signals equal or close to a discrimination frequency and the harmonic component of the discrimination frequency. If the amplitude difference exceeds a predetermined value, a servo area is discriminated. If the value is lower than the threshold, a data area is discriminated.

11 Claims, 2 Drawing Sheets

MAGNETIC DISK APPARATUS HAVING A CIRCUIT FOR DETECTING THE POSITION OF SERVO INFORMATION RECORDED ON A MAGNETIC DISK

BACKGROUND OF THE INVENTION

The present invention relates to a magnetic disk apparatus for carrying out recording and reading operations for a magnetic disk having information recorded on part of its data surface for aligning the magnetic head with the center of a track and, more particularly, to a magnetic disk apparatus having a circuit for detecting the recorded position of the servo information on the target track of the magnetic disk.

A magnetic disk apparatus of this kind, as described in the pending U.S. Patent Application Ser. No. 07/219,545 filed on July 15, 1988 by the same applicant, is used for performing a recording and reading operation on a magnetic disk having on its data surface a plurality of concentric circular tracks and, at the leading edge of each sector, a servo area in which servo information for aligning the magnetic head with the center of the target track in the track following mode. To distinguish the servo information from the data on the target track, a servo ID (identification) is recorded at the leading edge of the servo area. Upon detection of this servo ID after aligning the magnetic head by open loop control in the track seek mode, the magnetic disk apparatus reads the succeeding servo information recorded across a track boundary. The apparatus then detects the amount of positional deviation of the magnetic head from the center of the target track according to this servo information, and adjusts the position of the magnetic head correspondingly to that amount in the track following mode.

Servo ID's are recorded at a predetermined recording frequency. The magnetic disk apparatus, in order to detect these servo ID's, has a servo ID detecting circuit including a band-pass filter (separating circuit) passing the component of the servo ID recording frequency. The generation of a sampling signal for reading servo information is triggered by the detection of the amplitudes of signals having passed this filter to be greater than a predetermined amplitude.

When information recorded in the data area of a magnetic disk is read by a magnetic head, the amplitude of the reading signal will be greater if the intervals of magnetization inversion are shorter, whereas the amplitude will be smaller if the intervals are longer. As a result, a reading signal having the same frequency as that of the servo ID, or a frequency close to it, may be generated depending on the pattern of data recorded in the data area. The conventional magnetic disk apparatus described above is so structured that the component of the frequency recorded in the servo ID area is separated by the band-pass filter and signals whose amplitude reach or surpass a certain level are recognized as the servo ID. This results in the disadvantage that data in the data area may be mistaken for the servo ID, so that the magnetic head positioning motor is controlled with a reproduced data signal mistaken for servo information.

SUMMARY OF THE INVENTION

An object of the present invention, therefore, is to provide a magnetic disk apparatus capable of decreasing the possibility of mistaking a data signal read from the data area of a magnetic disk for a servo ID.

Another object of the invention is to provide a magnetic disk apparatus capable of accurately detecting a servo ID recorded in the servo area of a magnetic disk.

According to the present invention, there is provided a magnetic disk apparatus for carrying out a recording or reading operation for a magnetic disk. The disk includes a plurality of concentric tracks each of which has data areas for storing the user's data and servo areas followed by the data areas. Each of the servo areas includes servo information for aligning a magnetic head with the center of a target track and an identification (ID) signal recorded at a predetermined discrimination frequency to indicate the starting position of the servo area.

The disk apparatus comprises:

a reproducing means for reading a signal recorded on the target track through the magnetic head and supplying a reproduced signal;

first identifying means for extracting a signal component equal or close to the discrimination frequency from the reproduced signal and generating a first detection signal;

second identifying means for extracting a signal component having a harmonic of the discrimination frequency from the reproduced signal and generating a second detection signal;

subtracting means for determining an amplitude difference between the first detection signal and the second detection signal and supplying a subtraction signal; and detecting means for supplying a third detection signal indicating the detection of the discrimination signal when the subtraction signal reaches a predetermined threshold level.

BRIEF DESCRIPTION OF THE DRAWINGS

Other objects, advantages and features of the present invention will become more apparent from the following detailed description when taken in conjunction with the accompanying drawings, in which.

DESCRIPTION OF THE PREFERRED EMBODIMENT

Figure 1:
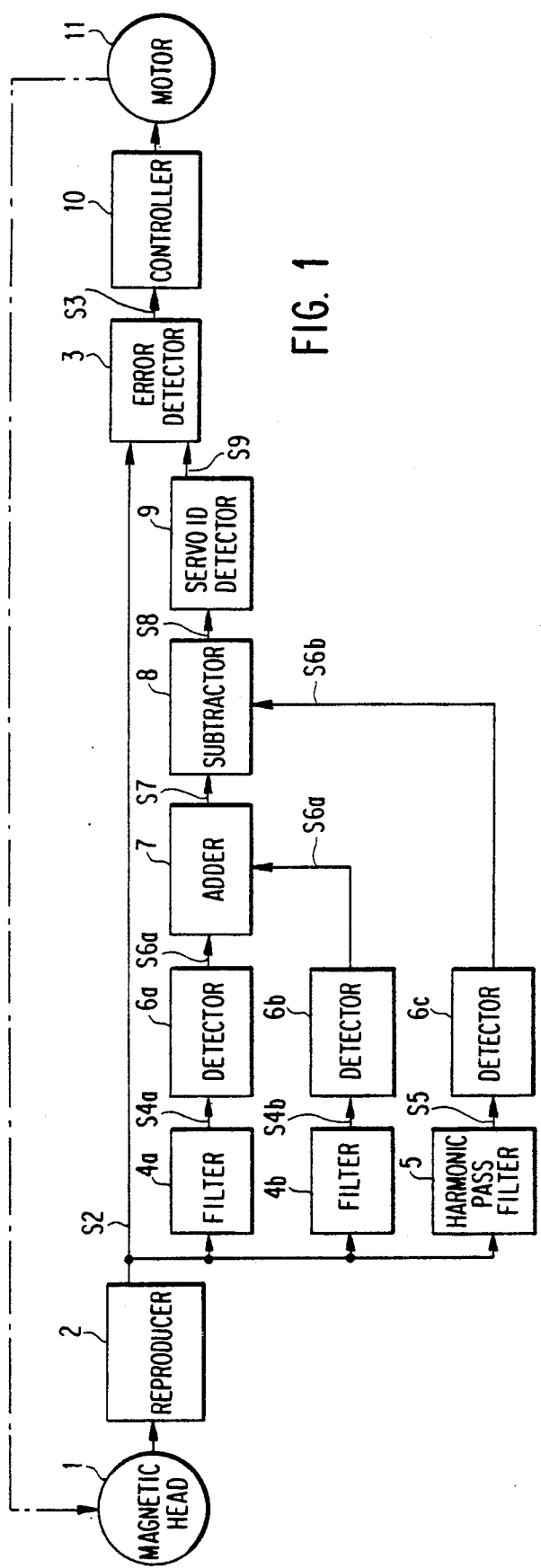
FIG. 1 is a block diagram illustrating an embodiment of the invention.

Referring to FIG. 1, a magnetic head 1 is roughly aligned with a target track on a magnetic disk under open loop control by a stepping motor 11 in a track seek mode. The magnetic head 1 then reads information recorded on the target track and supplies its output to a reproducer 2. The reproducer 2 amplifies the output signal of the magnetic head 1 and supplies the amplified signal as a reproduced signal S2 to a positional error detector 3, first and second band-pass filters (separating circuits) 4a and 4b and a harmonic-pass filter 5. The filters 4a and 4b separate signals of prescribed frequency bands, one frequency band being set for each filter, from the reproduced signal S2. The filters 4a and 4b supply the separated signals S4a and S4b to detectors 6a and 6b, respectively. The detectors 6a and 6b rectify and smooth the separated signals S4a and S4b and supply the resultant detection signals S6a and S6b, respectively, to an adder 7. The adder 7 adds the detection signals S6a and S6b into an added signal S7 which is supplied to a subtractor 8.

The harmonic-pass filter 5 is a band-pass filter for extracting only a prescribed harmonic component of the recording frequency of a servo ID, which will be described hereinafter. The filter 5 supplies a separated signal S5 to a detector 6c. The detector 6c rectifies and smoothes the separated signal S5 and supplies its output as a detection signal S6c to the subtractor 8. The subtractor 8 subtracts the signal S6c from the added signal S7 and supplies the resultant subtraction signal S8 to a servo ID detector 9.

The servo ID detector 9 compares the signal S8 with a predetermined threshold level and, upon arrival of the signal S8 at a certain level, supplies a servo ID detection signal S9 to the positional error detector 3. The positional error detector 3 reads components of servo information arranged on the inner and outer sides of the target track from the reproduced signal S2 with a sampling signal generated with reference to the detection signal S9. The detector 3 generates a positional error signal S3 according to the amplitude difference between the components of the servo information.

A controller 10 drives the stepping motor 11 in the direction causing the positional error signal S3 to become zero and thereby aligns the magnetic head 1 with the center of the target track. For details of the structure of the controller 10, reference may be made to the U.S. Pat. Nos. 4,788,608 and 4,831,471.

Figure 2:
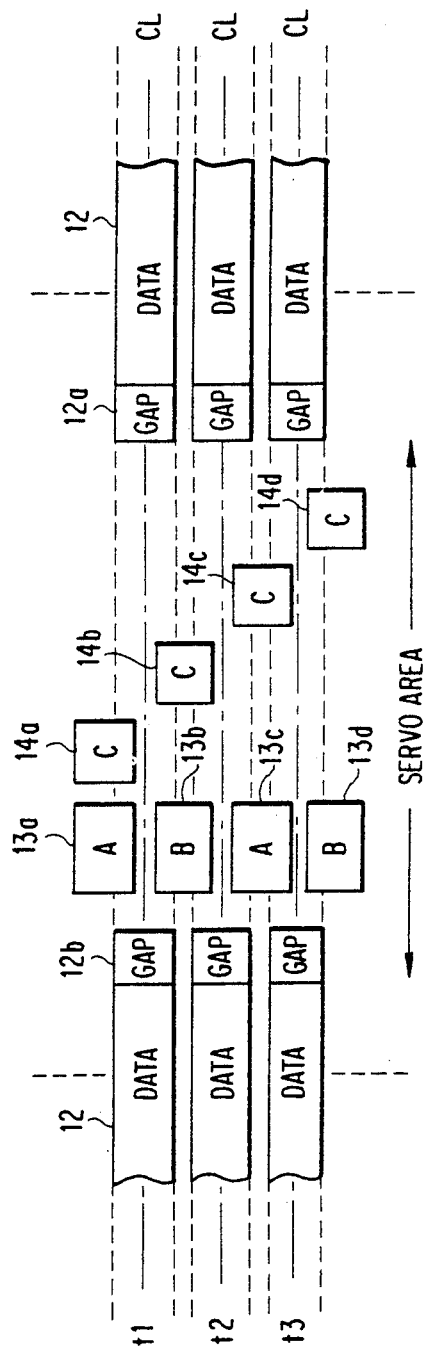
FIG. 2 illustrates the recording format of a magnetic disk used in the embodiment of the invention.

Referring now to FIG. 2 illustrating a part of tracks of a magnetic disk (floppy disk), a plurality of tracks t1, t2, . . . are concentrically arranged on the magnetic disk. The magnetic disk has a plurality of sectors divided into its radial directions. Each of the sectors has a data area 12 for storing a user's data, gap areas 12a and 12b at its two ends, and a servo area for storing servo information for controlling the position of the magnetic head 1 in a track following mode. The servo area of each sector includes, at positions between the center lines CL of every track, servo ID sections 13a, 13b, 13c and 13d indicating the start of the servo area and servo information sections 14a, 14b, 14c and 14d constituting information for detecting the magnetic head's position. When the disk rotates at 360 r.p.m. (revolution per minute), a pattern signal A of a low discrimination frequency (125 kHz) is recorded in the servo ID sections 13a and 13c. Another pattern signal B of another low discrimination frequency (62.5 kHz) is alternately recorded in the servo ID sections 13b and 13d. The servo ID sections 13a to 13d are arranged in a row in the radial direction of the disk. The servo information sections 14a to 14d are arranged in that order in the tracking direction (the circumferential direction of the disk), repeating the same pattern in a four-track cycle. In the servo information sections 14a to 14d, a pattern signal C of a frequency (312.5 kHz) is recorded. The above described format of the magnetic disk is the same as what is stated in the above-cited U.S. patent application Ser. No. 07/219,545.

Figure 3:
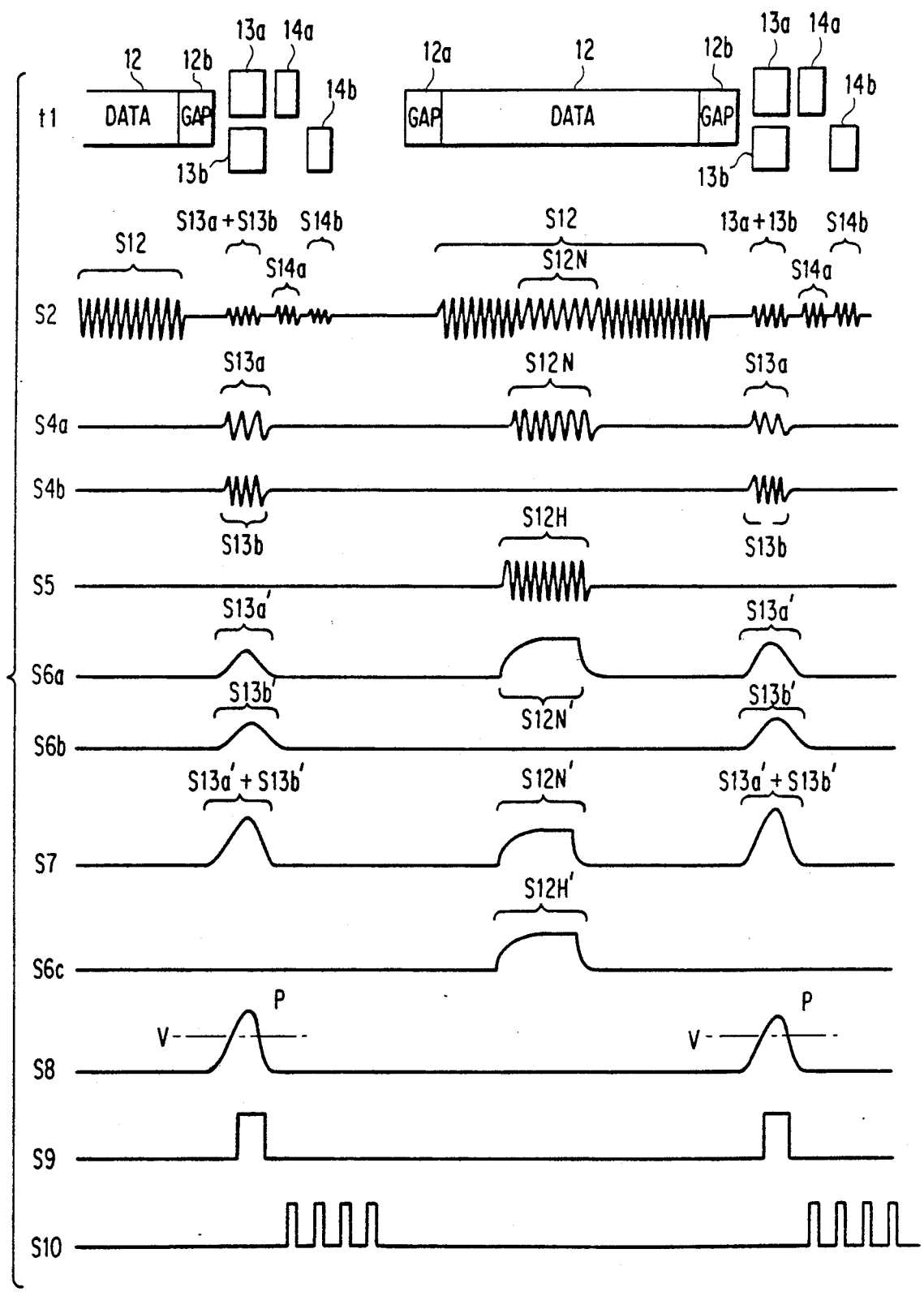
FIG. 3 is a waveform chart illustrating the operation of the embodiment of the invention.

Next will be described the operation of the preferred embodiment of the present invention with reference to FIG. 3.

As the magnetic head 1 is roughly aligned with the target track t1 in the track seek mode, the magnetic disk apparatus shifts to the track following mode for precisely aligning the magnetic head 1 with the center line of the track t1. The magnetic head 1 reads information recorded on the track t1. The reproducer 2 produces the reproduced signal S2 which includes a signal portion S12 obtained from the data area 12 on the track t1, a signal portion (S13a + S13b) obtained from the servo ID sections 13a and 13b, a signal portion S14a obtained from the servo information section 14a and a signal portion S14b obtained from the servo information section 14b. In FIG. 3, the reproduced signal S2 is shown in a typical form.

The filter 4a separates a signal portion S13a of 125 kHz in resonance frequency and supplies a separated signal S4a. If a frequency component equal or close to the recording frequency of the servo ID section 13a (125 kHz) is recorded in the data area 12 and if its amplitude is relatively great, a signal portion S12N will be generated in the reproduced signal S2. The filter 4a mistakes the signal portion S12N for the signal portion S13a obtained from the servo ID section 13a because the frequency of this signal portion S12N is equal or close to 125 kHz. The filter 4b separates a signal portion S13b of 62.5 kHz in resonance frequency from the reproduced signal S2 and generates the separated signal S4b indicating the position of the servo ID section 13b.

The detectors 6a and 6b rectify and smooth the separated signals S4a and S4b, respectively, and generate detection signals S6a and S6b which respectively have waveform peaks S13a', S12N' and S13b' in those parts which correspond to the signal parts S13a, S12N and S13b.

The position controlling unit described in the above cited U.S. patent application Ser. No. 07/219,545 simply adds detection signals S6a and S6b and compares the added signal S7 with a predetermined threshold level to detect the position of the servo ID. Therefore, if a wave S12N' has a greater amplitude than the threshold level, it will be mistaken for the servo, ID.

The inventors of the present invention found that the signal parts S13a and S12N having approximately the same frequency (125 kHz) could be distinguished from each other by detecting the amplitudes of their harmonic components. Thus they found that the amplitude of a signal of 375 kHz ($125 \times 3$ kHz) in frequency, which is a harmonic component of the signal part S13a obtained from the servo ID section 13a, was far smaller than that of the same harmonic component of the signal part S12N obtained from the data area 12.

Accordingly, in the preferred embodiment of the present invention, a signal having a frequency of 375 kHz (a harmonic component of the signal of 125 kHz in frequency) is separated from the reproduced signal S2 by the harmonic-pass filter 5. As indicated by the separated signal S5 of FIG. 3, the filter 5 does not detect the 375 kHz frequency harmonic component in the signal part (S13a + S13b) of the reproduced signal S2 because of its very small amplitude. Meanwhile the filter 5 does detect the 375 kHz frequency harmonic component in the signal part S12N because it has a large enough amplitude and supplies the separated signal S5 containing the signal part S12H. The separated signal S5 is entered into the detector 6c to be rectified into the detection signal S6c containing a wave S12H'.

The subtractor 8 subtracts the detection signal S6c from the added signal S7 and supplies the subtraction signal S8, in which is obtained a waveform resulting from the removal of the wave S12N' from the added signal S7. Thus, only the effect of only the signal part S12N obtained from the data area 12 is eliminated in the signal S8. Peaks p of the signal S8 indicates the positions of the servo ID sections 13a and 13b.

The subtraction signal S8 is entered into the servo ID detector 8 to be compared with a threshold level V and supplied to the positional error detector 3 as the pulse signal S9. The positional error detector 3 generates four timing pulses S10, each triggered by a trailing edge of the pulse signal S9, in conformity with the time intervals of servo information sections 14a to 14d. The reproduced signal S2 is read in synchronization with these timing pulses S10. As the target track is the track t1 in the illustrated example, the servo information signals S14a and S14b obtained from the sections 14a and 14b are used for the precise alignment. Thus the detector 3 reads the amplitudes of the servo information signals S14a and S14b at the timings of the first and second of the four timing pulses. The detector 3 detects and subjects to analog-to-digital conversion the amplitudes of the servo information signals S14a and S14b and supplies the controller 10 with a signal proportional to the amplitude difference between the two servo information signals S14a and S14b as the positional error signal 3. The controller 10 controls the position of the magnetic head 1 by driving the stepping motor 11 in the direction of reducing the positional error signal S3 to zero.

As described above, the present invention eliminates the possibility of erroneously outputting a servo ID detection signal in the data area, even if a data pattern which would generate a low frequency either equal or close to that of the servo ID section is recorded in the data area, by detecting a prescribed harmonic contained in the reproduced signal with a harmonic-pass filter and subtracting the detected harmonic from the output of the band-pass filter for servo ID detection. The invention accordingly, makes it possible to so control the stepping motor as to have the magnetic head faithfully follow the target track.

What is claimed is:

1. A magnetic disk apparatus for carrying out a recording or reading operation for a magnetic disk including a plurality of concentric tracks each having data areas for storing a user's data and servo areas followed by said data areas, each of said servo areas including servo information for aligning a magnetic head with a center of a target track and an identification signal recorded at a predetermined discrimination frequency to indicate a starting position of each of said servo areas, the disk apparatus comprising:

reproducing means for reading a signal recorded on said target track through said magnetic head and supplying a reproduced signal;

first identifying means for extracting a signal component equal or close to said discrimination frequency from said reproduced signal and generating a first detection signal;

second identifying means for extracting a signal component having a harmonic of said discrimination frequency from said reproduced signal and generating a second detection signal;

subtracting means for determining an amplitude difference between said first detection signal and said second detection signal and supplying a subtraction signal; and detecting means for detecting said discrimination signal when said subtraction signal reaches a predetermined threshold level, thereafter outputting a third detection signal.

2. A magnetic disk apparatus as claimed in claim 1, further comprising positional error detecting means for detecting a positional error of said magnetic head and for generating a positional error signal indicating an amount of deviation of said magnetic head from the center of said target track by generating sampling clocks triggered by said third detection signal and reading said servo information out of said reproduced signal in accordance with said sampling clocks.

3. A magnetic disk apparatus as claimed in claim 2, further comprising driving means responsive to said positional error signal for driving said magnetic head toward the center line of said target track.

4. A magnetic disk apparatus as claimed in claim 1, wherein said second identifying means detects a harmonic component whose frequency is three times as high as said discrimination frequency.

5. A magnetic disk apparatus as claimed in claim 1, wherein said first identifying means includes a band-pass filter passing signal components equal or close to said discrimination frequency and contained in said reproduced signal, and a detector for rectifying and smoothing the output from said band-pass filter and supplying said first detection signal.

6. A magnetic disk apparatus as claimed in claim 1, wherein said second identifying means has a harmonic-pass filter passing signal components of said harmonic contained in said reproduced signal, and a detector for rectifying and smoothing the output from said harmonic-pass filter and supplying said second detection signal.

7. A magnetic disk apparatus as claimed in claim 1, further comprising a third identifying means for extracting a second signal component of a predetermined frequency from said reproduced signal and generating a fourth detection signal, said second signal component having a different frequency from said signal component extracted by said first identifying means.

8. A magnetic disk apparatus as claimed in claim 7, further comprising adding means for adding said first detection signal and said fourth detection signal, and outputting an added signal to said subtracting means.

9. A magnetic disk apparatus as claimed in claim 8, wherein said subtracting means includes means for determining an amplitude difference between said added signal and said second detection signal, and for generating a subtraction signal.

10. A magnetic disk apparatus as claimed in claim 7, wherein said subtracting means includes means for determining an amplitude difference between said fourth detection signal and said second detection signal, and for generating a subtraction signal.

11. A magnetic disk apparatus as claimed in claim 7, wherein said third identifying means comprises a band-pass filter passing signal components of said predetermined frequency and contained in said reproduced signal, and a detector for rectifying and smoothing the output from said band-pass filter and supplying said fourth detection signal.

* * * * *

UNITED STATES PATENT AND TRADEMARK OFFICE
CERTIFICATE OF CORRECTION

PATENT NO. : 5,023,732

DATED : June 11, 1991

INVENTOR(S) : Y. Murakami, Y. Okawa and T. Ishikawa

It is certified that error appears in the above-identified patent and that said Letters Patent is hereby corrected as shown below:

Col. 1, line 10, after "having" insert -- servo --

Signed and Sealed this

Third Day of November, 1992

Attest:

DOUGLAS B. COMER

Attesting Officer

Acting Commissioner of Patents and Trademarks